United States Patent [19]

Liu

[11] Patent Number: 4,728,699
[45] Date of Patent: Mar. 1, 1988

[54] POLYCARBONATE RESINS CONTAINING DIATOMACEOUS EARTH

[75] Inventor: Ping Y. Liu, Naperville, Ind.

[73] Assignee: General Electric Company, Mt. Vernon, Ind.

[21] Appl. No.: 794,703

[22] Filed: Nov. 4, 1985

[51] Int. Cl.⁴ .................................................. C08K 3/34
[52] U.S. Cl. ..................................... 524/448; 524/611
[58] Field of Search ........................................ 524/448

[56] References Cited

U.S. PATENT DOCUMENTS

| | | | |
|---|---|---|---|
| 3,398,212 | 8/1968 | Jackson et al. | 528/173 |
| 3,419,460 | 12/1968 | Ure | 524/448 |
| 4,405,731 | 9/1983 | Carter | 524/448 |
| 4,478,964 | 10/1984 | Carter | 524/448 |

OTHER PUBLICATIONS

Goodman et al.; Polyesters, vol. 1; Iliffe Books Ltd.; 1965; pp. 1, 2, 3, 142, 143.
Katz et al.; Handbook of Fillers and Reinforcements for Plastics; Van Nostrand Reinhold Co.; 1978; pp. 24, 154.

Primary Examiner—Lewis T. Jacobs
Attorney, Agent, or Firm—Martin B. Barancik

[57] ABSTRACT

A composition comprising an aromatic polycarbonate in admixture with a diatomaceous earth, the said diatomaceous earth having a major quantity of cristabolite, the quantity of diatomaceous earth such that the kinetic coefficient of friction is substantially decreased when a self supporting film is prepared from the composition.

10 Claims, No Drawings

POLYCARBONATE RESINS CONTAINING DIATOMACEOUS EARTH

BACKGROUND OF THE INVENTION

Polycarbonate resin films, due to their many advantageous properties, are used in many industrial and commercial applications. Polycarbonate resin films, such as for example those derived from 2,2-bis(4-hydroxyphenyl)propane and phosgene, exhibit excellent optical clarity, high dimensional stability, excellent color, high heat resistance, and a high resistance to oxidative degradation.

However, polycarbonate films possess a very high film-to-film kinetic coefficient of friction. This makes handling of polycarbonate films difficult and restricts the use of such films in automatic processing equipment, such as for example packaging equipment, where successful operations necessitate kinetic coefficients of film friction considerably lower than those exhibited by conventional polycarbonate resin films. One effort to produce polycarbonate resin compositions which provide a self-sustaining film exhibiting a commercially acceptable coefficient of friction is described in U.S. Pat. No. 3,434,703. This patent describes a polycarbonate composition containing a polycarbonate resin having intimately dispersed therein a particular modifier which may be either silica or talc and which has an average diameter of up to about 10 microns and which is present in an amount of from about 0.025 to about 0.50 weight percent. The static coefficient of friction is reduced. U.S. Pat. No. 4,405,731 discloses that both the static and kinetic coefficients of friction are reduced by the presence of starch in the polycarbonate composition. Several of the examples at Table 2 of this patent also have small quantities of diatomaceous earth present together with the starch. There is no indication in the reference that the diatomaceous earth will be an effective additive for reducing the kinetic coefficient of friction by itself.

It has been surprisingly discovered that small quantities of diatomaceous earth in admixture with an aromatic polycarbonate provides a film exhibiting a low kinetic coefficient of friction. The presence of starch is not necessary for the diatomaceous earth to have this activity.

SUMMARY OF THE INVENTION

In accordance with the invention, there is a composition comprising an aromatic polycarbonate in admixture with a diatomaceous earth, the diatomaceous earth having a major quantity of cristabolite and the quantity of diatomaceous earth such that the kinetic coefficient of friction is substantially decreased when a self supporting film is prepared from the composition.

DESCRIPTION OF THE INVENTION

The aromatic polycarbonates useful in the invention are typified as possessing recurrent structural units of the formula:

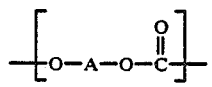

Formula 1 wherein A is a divalent aromatic radical of the dihydric phenol employed in the polymer producing reaction.

Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus.

Typical dihydric phenols are
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether;
and the like.

A variety of additional dihydric phenols which may be employed to provide such carbonate polymers are disclosed in commonly assigned Goldberg, U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention copolyestercarbonates as disclosed in Goldberg U.S. Pat. No. 3,169,121 are also included within the term polycarbonate. Branched polycarbonates are also useful. To avoid unnecessarily detailed description, the disclosures of U.S. Pat. Nos. 3,028,365; 3,334,154; 4,001,184 and 4,131,575 are incorporated herein by reference. In any event, the preferred aromatic carbonate polymer is a homopolymer derived from 2,2-bis(4-hydroxyphenyl)propane (bisphenol-A).

In short, the dihydric phenol is preferably represented by the formula

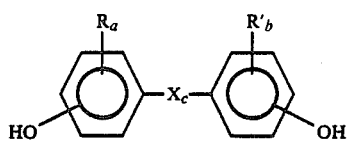

Formula 2 wherein R and R' are the same or different and are alkyl of one to form carbon atoms, inclusive, preferably one to three, and halogen, preferably chloro or bromo.

The letters a and b are the same or different and are an integer of 0, 1, 2, 3 or 4, preferably 0, 1 or 2.

X is selected from alkylene of two to ten carbon atoms, inclusive, alkylidene of one to ten carbon atoms, inclusive, cycloalkylene of four to twelve carbon atoms, inclusive, cycloalkylidene of four to twelve carbon atoms, inclusive, —S—, —S—S—,

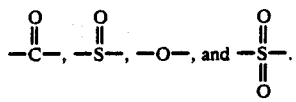

c is 0 or 1.

The additive employed to reduce the kinetic coefficient of friction is a diatomaceous earth which has a major quantity of cristabolite. Diatomaceous earth occurs primarily from the deposition of the exoskeletons of diatoms. The major amount of the diatomaceous earth used in this invention is cristabolite, a silica occurring in white octahedra which is stable at high temperatures. By major quantity is meant at least 55 weight percent of the diatomaceous earth is cristabolite. A minimum of 60 weight percent is preferred. The maximum quantity of cristabolite is not critical to the invention, although generally the diatomaceous earth is not more than 90 to 95 weight percent cristabolite. The diatomaceous earth is preferably calcined while in the presence of a flux such as soda ash or sodium chloride. The preferred diatomaceous earth is VX31007 Super Floss obtained from Ferro Corporation, Cleveland, Ohio. The material is obtained as a fine white powder with a specific gravity of 2.3 and containing approximately 60 weight percent of free crystalline silica as crystabolite, CAS #68855-54-9.

The quantity of diatomaceous earth which should be employed is a quantity which brings about the desired low kinetic coefficient of friction in the self supporting film. Generally a range of from about 0.1 to about 1.0 weight percent of the aromatic polycarbonate should be present as diatomaceous earth, preferably 0.25 to about 0.75 weight percent.

In order that those skilled in the art may better understand the present invention the following examples are presented by way of illustration and not by way of limitation. In the examples all parts and percentages are on a weight basis as previously defined unless otherwise specified.

The aromatic polycarbonate and additive are mixed together using standard equipment and conditions. Films of the composition are made by casting from methylene chloride. The film average thickness is 1 mil with transparency of about 89% as measured on a Gardner XL-835 Colorimeter. At levels of about 1.0 wt. percent or higher the transparency is somewhat reduced. Kinetic coefficient of friction is determined by ASTM D1894 and the results set forth in Table I.

CONTROL 1

This example illustrates a film formed from dissolving 22 g. of bisphenol-A polycarbonate in 100 ml of methylene chloride and then casting the film therefrom.

CONTROL 2

The procedure of Control 1 is substantially repeated except that 0.5 weight percent talc is added to the polycarbonate in the dry form.

EXAMPLE 1

The procedure of Control 1 is followed except that 0.125 weight percent of the diatomaceous earth VX31007 Super Floss obtained from Ferro Corporation is added to the polycarbonate.

EXAMPLES 2-5

Following the procedure of Example 1 but using respectively 0.25 (Example 2), 0.5 (Example 3), 0.7 (Example 4) and 1.0 (Example 5) weight percent of the additive in Example 1 films were made and tested.

Below are the results:

TABLE

| SAMPLE | WT. % ADDITIVE | KINETICS COEFFICIENT OF FRICTION |
| --- | --- | --- |
| Control | | |
| 1 | 0 | 10.0 |
| 2 | 0.5 | 0.5 |
| Example | | |
| 1 | 0.125 | 0.55 |
| 2 | 0.25 | 0.39 |
| 3 | 0.5 | 0.47 |
| 4 | 0.7 | 0.50 |
| 5 | 1.0 | 0.53 |

The results show that the additive of this invention is more active on a weight to weight basis than talc and brings about a low kinetic coefficient of friction.

What is claimed is:

1. A composition comprising an aromatic polycarbonate in admixture with a diatomaceous earth, the said diatomaceous earth having a major quantity of cristabolite, the quantity of diatomaceous earth such that the kinetic coefficient of friction is substantially decreased when a self supporting film is prepared from the composition, said composition essentially free of starch.

2. The composition in accordance with claim 1 wherein the quantity of diatomaceous earth is from about 0.1 to 1.0 weight percent of the aromatic polycarbonate.

3. The composition in accordance with claim 2 wherein the aromatic polycarbonate is bisphenol-A polycarbonate.

4. The composition in accordance with claim 2 wherein the aromatic polycarbonate is a copolyestercarbonate.

5. The composition in accordance with claim 4 wherein the copolyestercarbonate is derived from a carbonate precursor, a dihydric phenol and an aromatic diacid precursor selected from the group consisting of terephthalic acid precursor, an isophthalic acid precursor and a mixture of the terephthalic and isophthalic acid precursor.

6. A thin self-sustaining film of the composition of claim 1.

7. A thin self-sustaining film of the composition of claim 2.

8. A thin self-sustaining film of the composition of claim 3.

9. A thin self-sustaining film of the composition of claim 4.

10. A thin self-sustaining film of the composition of claim 5.

* * * * *